(12) United States Patent
Zhuang

(10) Patent No.: US 10,863,011 B2
(45) Date of Patent: Dec. 8, 2020

(54) WIRELESS ANTI-THEFT MOBILE PHONE DISPLAY STAND

(71) Applicant: Ontime RFID Technology (Changxing) Co., LTD, Huzhou (CN)

(72) Inventor: Xiaodong Zhuang, Huzhou (CN)

(73) Assignee: Ontime RFID Technology (Changxing) Co., LTD, Huzhou (CN)

( * ) Notice: Subject to any disclaimer, the term of this patent is extended or adjusted under 35 U.S.C. 154(b) by 0 days.

(21) Appl. No.: 16/748,932

(22) Filed: Jan. 22, 2020

(65) Prior Publication Data

US 2020/0296195 A1    Sep. 17, 2020

(30) Foreign Application Priority Data

Mar. 12, 2019    (CN) .................... 2019 2 0312573 U

(51) Int. Cl.
*H04M 1/04*    (2006.01)
*H04M 1/02*    (2006.01)

(52) U.S. Cl.
CPC ............. *H04M 1/04* (2013.01); *H04M 1/026* (2013.01)

(58) Field of Classification Search
None
See application file for complete search history.

(56) References Cited

U.S. PATENT DOCUMENTS

| 6,816,713 | B2 * | 11/2004 | Chen ........................ | H04M 1/04 379/445 |
| 7,103,760 | B1 * | 9/2006 | Billington .................. | G06F 1/16 399/107 |
| 7,663,502 | B2 * | 2/2010 | Breed ....................... | G01S 17/04 340/12.25 |
| 8,035,508 | B2 * | 10/2011 | Breed ...................... | B60R 16/037 340/539.11 |
| 2005/0107121 | A1 * | 5/2005 | Gamble ............ | H04M 1/72502 455/557 |
| 2006/0229108 | A1 * | 10/2006 | Cehelnik ........... | H04M 1/72522 455/569.1 |
| 2010/0317407 | A1 * | 12/2010 | Ferren .................. | G06F 1/1626 455/566 |
| 2010/0323657 | A1 * | 12/2010 | Barnard ................ | H04W 4/029 455/404.1 |
| 2013/0002110 | A1 * | 1/2013 | Nemoto .............. | B60R 11/0211 312/248 |

(Continued)

*Primary Examiner* — Lana N Le
(74) *Attorney, Agent, or Firm* — Proi Intellectual Property US; Klaus Michael Schmid

(57) ABSTRACT

The invention relates to mobile phone display stands, and aims to provide a wireless anti-theft mobile phone display stand which allows a mobile phone to be taken conveniently and fulfills a good anti-theft effect. The technical solution is as follows: the wireless anti-theft mobile phone display stand comprises a mainframe and a sensor inserted into the mainframe through a slotted structure which includes an insertion opening formed in the front face of the mainframe, slide grooves formed in two sides of the insertion opening, slide blocks which are arranged on two sides of the sensor and matched with the slide grooves, and a lug boss which is arranged at the bottom of the insertion opening and used for supporting the sensor; a mainframe mainboard, a mainframe wireless-distance-measurement module, a mainframe warner, and a mainframe battery are arranged in the mainframe.

5 Claims, 8 Drawing Sheets

(56) References Cited

U.S. PATENT DOCUMENTS

2014/0089243 A1* 3/2014 Oppenheimer ......... G06F 21/88
  706/46
2014/0194161 A1* 7/2014 Du .................... H04M 1/72527
  455/557
2016/0173970 A1* 6/2016 Kalyvas ............... H04R 1/1041
  455/569.1

* cited by examiner

WIRELESS ANTI-THEFT MOBILE PHONE DISPLAY STAND

TECHNICAL FIELD

The invention relates to mobile phone display stands, in particular to a wireless anti-theft mobile phone display stand.

DESCRIPTION OF RELATED ART

Mobile phone display stands as mobile phone display devices commonly used in malls fulfill an advertising effect and effectively promote product marketing. However, in view of anti-theft and charging demands, existing mobile phone display stands are connected to mobile phones through wires, and consequentially, it is inconvenient for customers to try out the mobile phones due to wire restraints, and the experience is poor. Thus, the existing mobile phone display stands need to be further improved.

BRIEF SUMMARY OF THE INVENTION

The objective of the invention is to overcome the shortcomings in the description of related art by providing a wireless anti-theft mobile phone display stand which allows a mobile phone to be taken conveniently and fulfills a good anti-theft effect.

The technical solution of the invention is as follows:

A wireless anti-theft mobile phone display stand comprises a mainframe and a sensor inserted into the mainframe through a slotted structure which includes an insertion opening formed in the front face of the mainframe, slide grooves formed in two sides of the insertion opening, slide blocks which are arranged on two sides of the sensor and matched with the slide grooves, and a lug boss which is arranged at the bottom of the insertion opening and used for supporting the sensor;

A mainframe mainboard, a mainframe wireless-distance-measurement module, a mainframe warner, and a mainframe battery are arranged in the mainframe, a power line is arranged on the back face of the mainframe, and a charging interface is formed in the lug boss of the mainframe; and the mainframe mainboard is connected to the mainframe wireless-distance-measurement module, the mainframe warner, the mainframe battery, the power line, and the charging interface through wires; and A sensor mainboard, a sensor wireless-distance-measurement module, a sensor warner, and a sensor battery are arranged in the sensor, a mobile phone charging plug and a charging connector matched with the charging interface are arranged at the bottom of the sensor, and an anti-dismantle switch is arranged on the front face of the sensor; and the sensor mainboard is connected to the sensor wireless-distance-measurement module, the sensor warner, the sensor battery, the mobile phone charging plug, the charging connector, and the anti-dismantle switch through wires.

A Bluetooth module connected to the mainframe mainboard through a wire is arranged in the mainframe, and a micro-switch connected to the mainframe mainboard through a wire is arranged in the insertion opening.

A mainframe IR module connected to the mainframe mainboard through a wire is arranged in the mainframe, and a sensor IR module connected to the sensor mainboard through a wire is arranged in the sensor.

A mobile phone fixing adhesive is arranged on the front face of the sensor, and mainframe fixing adhesive is arranged at the bottom of the mainframe.

The sensor warner includes a buzzer and a vibration motor, and the mainframe warner includes a buzzer.

The invention has the following beneficial effects:

The wireless anti-theft mobile phone display stand comprises the sensor and the mainframe, allows mobile phones to be installed and taken conveniently, has high anti-theft performance, is suitable for displaying various types of mobile phones, and enables customers to try out the mobile phones freely, thus improving the experience of the customers to a great extent.

DETAILED DESCRIPTION OF THE INVENTION

The invention is further expounded below in combination with the accompanying drawings in the specification, and is not limited to the following embodiment.

Figure 1:
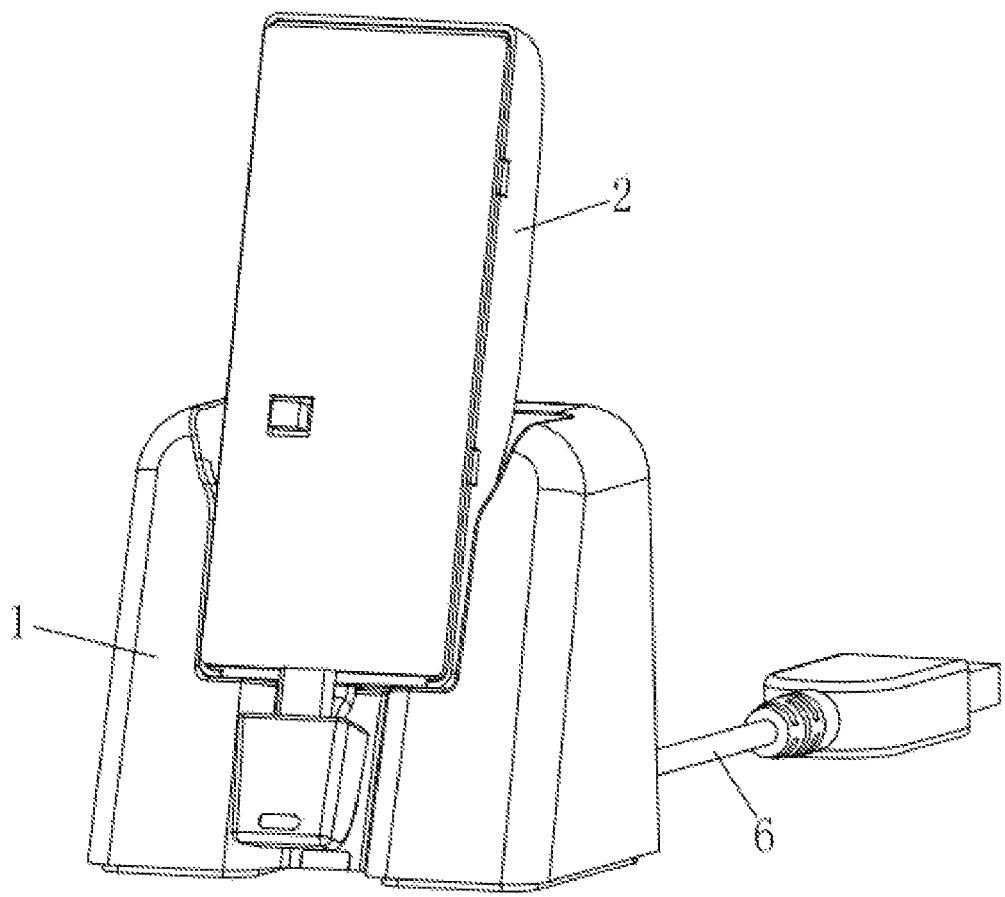
FIG. 1 is a perspective view of the invention.
Figure 7:
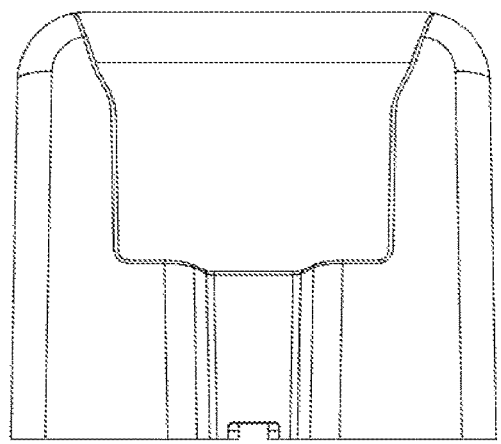
FIG. 7 is a front view of the mainframe of the invention.
Figure 8:
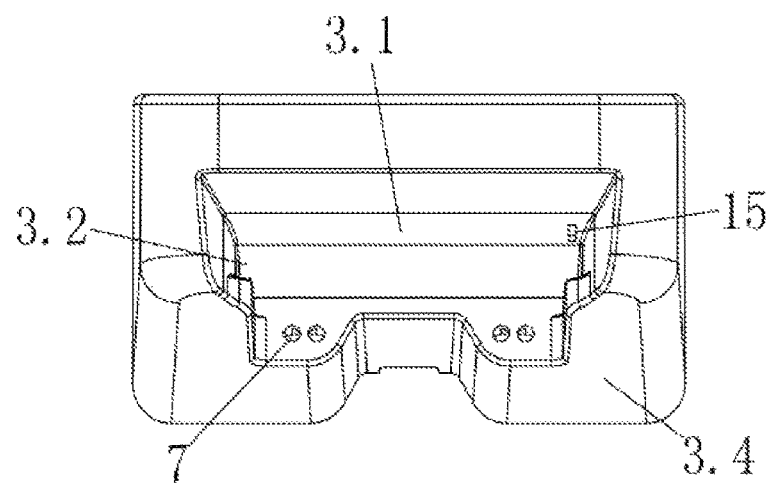
FIG. 8 is a top view of the mainframe of the invention.
Figure 9:
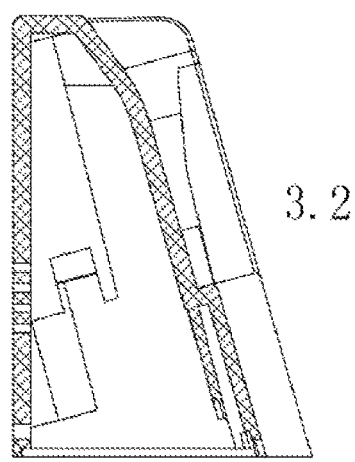
FIG. 9 is a left view of the mainframe of the invention.
Figure 10:
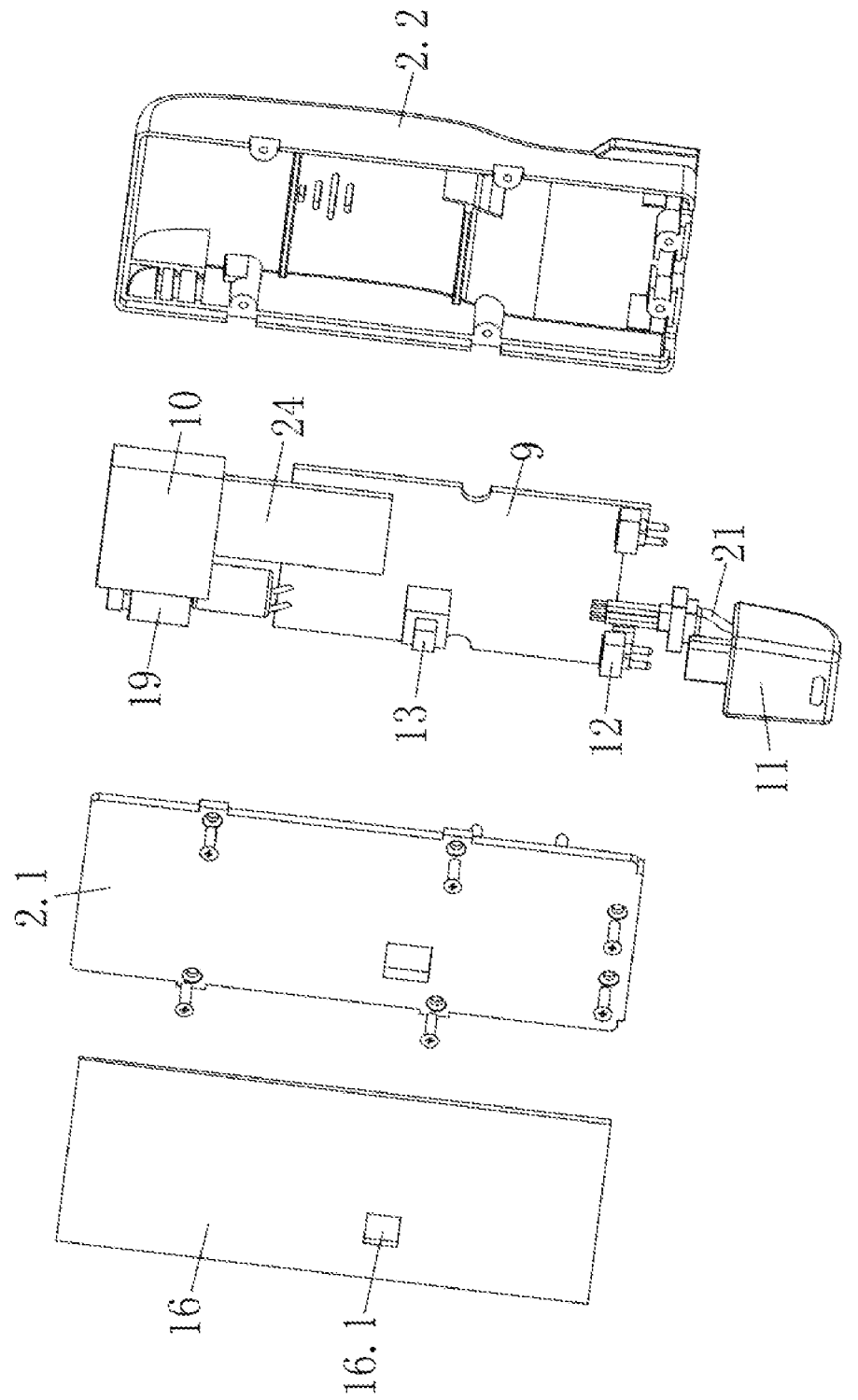
FIG. 10 is an exploded view of the sensor of the invention.
Figure 11:
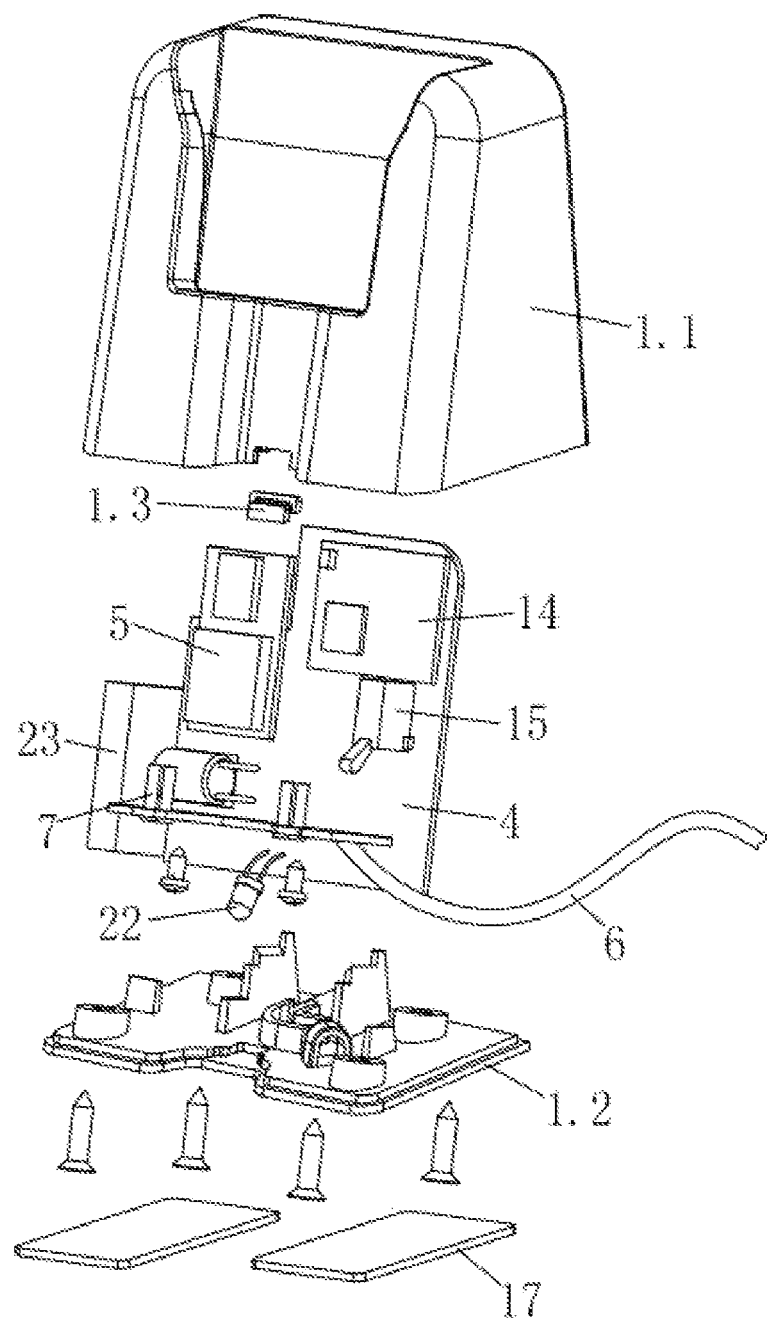
FIG. 11 is an exploded view of the mainframe of the invention.

As shown in FIG. 1, a wireless anti-theft mobile phone display stand comprises a mainframe 1 and a sensor 2 inserted into the mainframe through a slotted structure. In the slotted structure, an insertion opening 3.1 is formed in the front face of the mainframe (as shown in FIG. 2 and FIG. 7) and is adapted to the sensor in shape, slide grooves 3.2 are formed in two sides of the insertion opening, slide blocks 3.3 matched with the slide grooves are arranged on two sides of the sensor, and a lug boss 3.4 used for supporting the sensor is arranged at the bottom of the insertion opening.

A mainframe mainboard 4, a mainframe wireless-distance-measurement module 5, a mainframe warner, a mainframe battery 23, a Bluetooth module 14, and a mainframe IR module (omitted in figures) are arranged in the mainframe, a power line 6 is arranged on the back face of the mainframe, a micro-switch 15 is arranged in the insertion opening of the mainframe, charging interfaces 7 and troughs 8 used for accommodating charging connectors of the sensor are formed in the lug boss of the mainframe, and mainframe fixing adhesives 17 are arranged at the bottom of the mainframe.

The mainframe mainboard is connected to the mainframe wireless-distance-measurement module, the mainframe warner, the mainframe battery, the Bluetooth module, the mainframe IR module, the power line, the micro-switch, and the charging interfaces through wires. A mainframe shell is composed of a top shell 1.1 and a bottom plate 1.2, the insertion opening is formed in the top shell, the lug boss is arranged on the top shell, and the mainframe fixing adhesives are attached to the bottom plate. The mainframe warner is a buzzer (omitted in the figures). The mainframe mainboard is further provided with an indicator light 22, the top shell of the mainframe is provided with a light guide sheet 1.3 in cooperation with the indicator light which is used for displaying the operating state of the mainframe.

Figure 2:
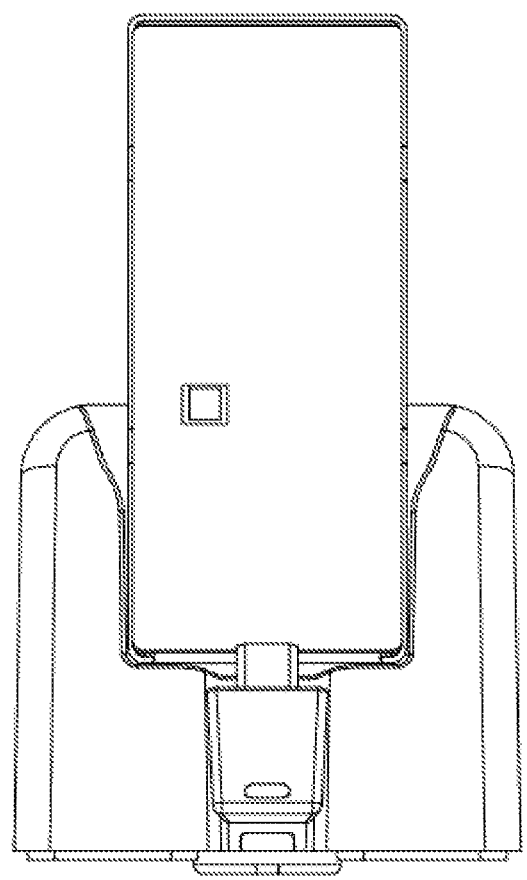
FIG. 2 is a front view of the invention.
Figure 3:
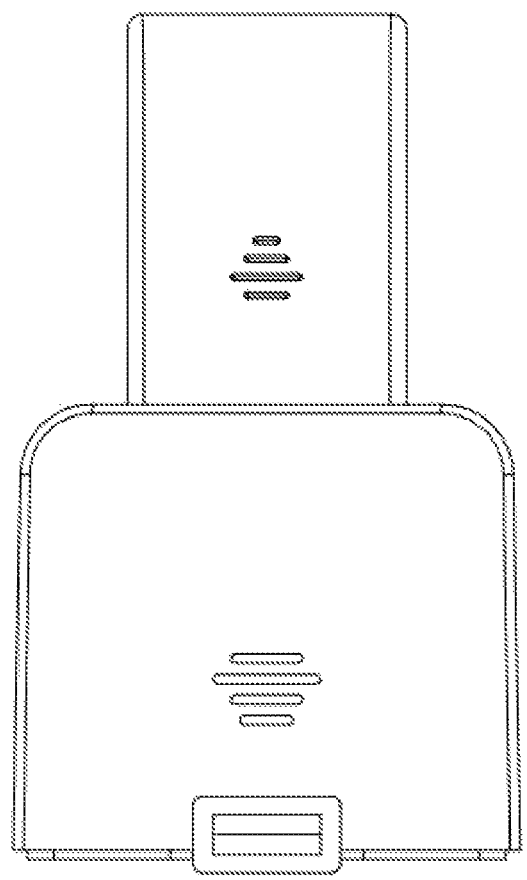
FIG. 3 is a rear view of the invention.
Figure 4:
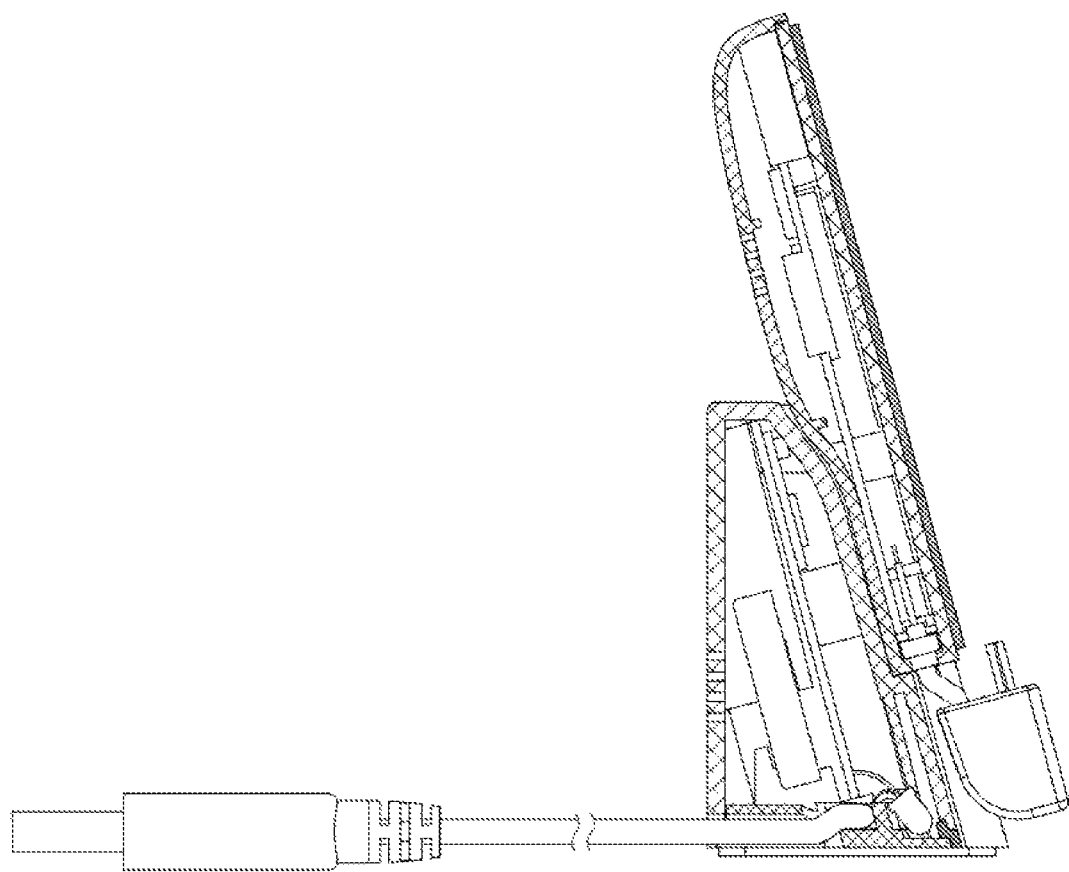
FIG. 4 is a left view of the invention.
Figure 5:
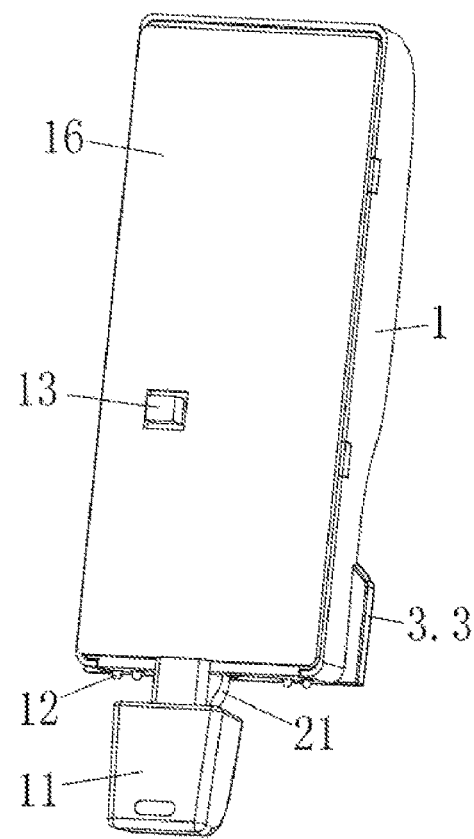
FIG. 5 is a perspective view of a sensor of the invention.
Figure 6:
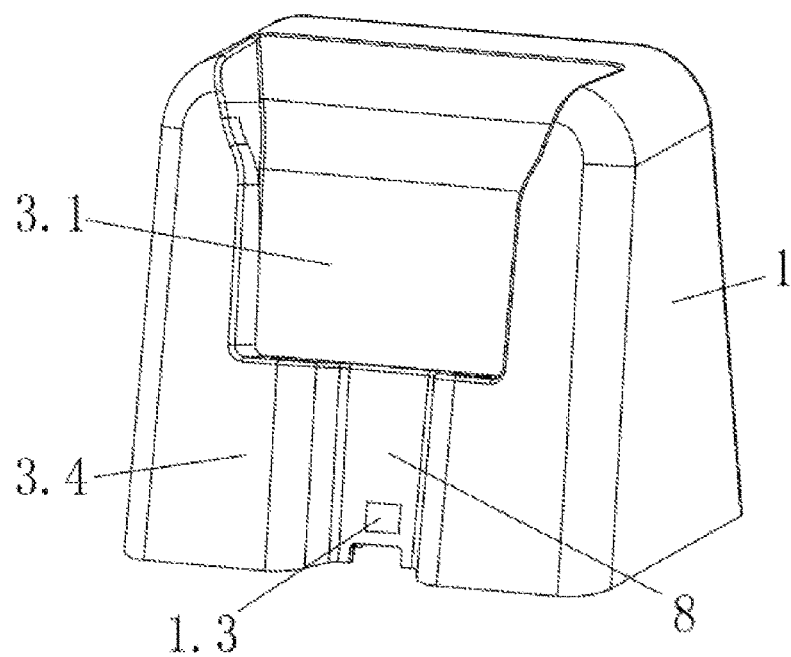
FIG. 6 is a perspective view of a mainframe of the invention.

A sensor mainboard 9, a sensor wireless-distance-measurement module 24, a sensor warner, a sensor battery 10, and a sensor IR module (omitted in the figures) are arranged in the sensor, a mobile phone charging plug 11 and the charging connectors 12 are arranged at the bottom of the sensor, and an anti-dismantle switch 13 and a sample fixing adhesive 16 are arranged on the front face of the sensor (as shown in FIG. 2), and the mobile phone charging plug is connected to the sensor mainboard through a flexible wire 21 to be compatible with mobile phones having different sizes and thicknesses.

The sensor mainboard is connected to the sensor wireless-distance-measurement module, the sensor warner, the sensor battery, the sensor IR module, the mobile phone charging plug, the charging connectors, and the anti-dismantle switch through wires. The sensor warner includes a buzzer (omitted in the figures) and a vibration motor 19. A sensor shell is composed of a front cover 2.1 and a rear shell 2.2, the anti-dismantle switch is arranged on the front cover, and a sensor fixing adhesive is attached to the front cover and has an opening 16.1 matched with the anti-dismantle switch.

The mainframe IR module and the sensor IR module of CHQE-1.27 are recommended to be used. The mainframe wireless-distance-measurement module and the sensor wireless-distance-measurement module of DWM1000 are recommended to be used. A mobile phone fixing adhesive and the mainframe fixing adhesives are 3M adhesives.

The mainframe is affixed to a table surface through the mainframe fixing adhesives, a mobile phone is affixed to the sensor through the mobile phone fixing adhesive, the mobile phone charging plug of the sensor is inserted into the charging port of the mobile phone, and the sensor is stored on the mainframe through the slotted structure. When the sensor is located on the mainframe, the charging connectors of the sensor interface with the charging interfaces of the mainframe, a customer directly pulls the sensor out of the mainframe when trying out the mobile phone and can try out the mobile phone freely within a certain range around the mainframe, and if the distance between the sensor and the mainframe exceeds a preset distance, the customer will be prompted by an alarm. The customer only needs to place the sensor at the top of the insertion opening of the mainframe and align the slide blocks to the slide grooves and then slide the sensor to the bottom of the insertion opening (the charging connectors automatically interface with the charging interfaces) after trying out the mobile phone, and through the insertion guide effect of the slotted structure, the sensor is facilitated to return to a great extent.

An external power source supplies power to the mainframe through the power line (the mainframe is powered by the mainframe battery during a power outage). When the sensor is located on the mainframe, the mainframe supplies power to the sensor (and charges the sensor battery at the same time) and charges the mobile phone through the sensor. When the customer takes out the sensor to try out the mobile phone, the charging connectors disengage from the charging interfaces, and in this case, the sensor is powered by the sensor battery. All parts of the invention can be purchased to be obtained.

The operating principle of the invention is as follows:

When the mobile phone is tried out by the customer, the micro-switch on the mainframe will be triggered at the moment the sensor is inserted or pulled, and the main frame sends trial data (such as the taken-out times of the mobile phone) of the customer to the outside through the Bluetooth module to facilitate the data statistics and analysis of a background; an anti-dismantle switch on the sensor will be triggered to start the buzzer of the sensor to given an alarm when the mobile phone is separated from the sensor; the mainframe communicates with the sensor wireless-distance-measurement module and calculates the distance between the mainframe and the sensor; if the distance between the mainframe and the sensor is exceeds a preset safety distance, the sensor vibrates (the vibration motor in the sensor is started) first to remind the customer to pay attention to a trial distance, and if the distance between the mainframe and the sensor exceeds a preset warning distance (which is greater than the safety distance), the buzzers of the mainframe and the sensor are started to give alarms so as to prompt staff to pay attention to product security; and the staff can operate an external remote to turn off the alarms (the mainframe IR module and the sensor IR module are used for receiving remote control signals from the outside).

What is claimed is:

1. A wireless anti-theft mobile phone display stand, comprising a mainframe (1) and a sensor (2) inserted into the mainframe through a slotted structure which includes an insertion opening (3.1) formed in a front face of the mainframe, slide grooves (3.2) formed in two sides of the insertion opening, slide blocks (3.3) which are arranged on two sides of the sensor and matched with the slide grooves, and a lug boss (3.4) which is arranged at a bottom of the insertion opening and used for supporting the sensor, wherein:

A mainframe mainboard (4), mainframe wireless-distance-measurement module (5), mainframe warner, and mainframe battery (23) are arranged in the mainframe, a power line (6) is arranged on a back face of the mainframe, and a charging interface (7) is formed in the lug boss of the mainframe; and the mainframe mainboard is connected to the mainframe wireless-distance-measurement module, the mainframe warner, the mainframe battery, the power line, and the charging interface through wires; and A sensor mainboard (9), sensor wireless-distance-measurement module (24), sensor warner, and sensor battery (10) are arranged in the sensor, a mobile phone charging plug (11) and a charging connector (12) matched with the charging interface are arranged at a bottom of the sensor, and an anti-dismantle switch (13) is arranged on a front face of the sensor; and the sensor mainboard is connected to the sensor wireless-distance-measurement module, the sensor warner, the sensor battery, the mobile phone charging plug, the charging connector, and the anti-dismantle switch through wires.

2. The wireless anti-theft mobile phone display stand according to claim 1, wherein a Bluetooth module (14) connected to the mainframe mainboard through a wire is arranged in the mainframe, and a micro-switch (15) connected to the mainframe mainboard through a wire is arranged in the insertion opening.

3. The wireless anti-theft mobile phone display stand according to claim 2, wherein a mainframe IR module connected to the mainframe mainboard through a wire is arranged in the mainframe, and a sensor IR module connected to the sensor mainboard through a wire is arranged in the sensor.

4. The wireless anti-theft mobile phone display stand according to claim 3, wherein a mobile phone fixing adhesive (16) is arranged on the front face of the sensor, and a mainframe fixing adhesive (17) is arranged at a bottom of the mainframe.

5. The wireless anti-theft mobile phone display stand according to claim 4, wherein the sensor warner includes a buzzer and a vibration motor (19), and the mainframe warner includes a buzzer.

* * * * *